(12) United States Patent
Reininger

(10) Patent No.: US 11,360,496 B2
(45) Date of Patent: Jun. 14, 2022

(54) VALVE DEVICE

(71) Applicant: TRUMA GERAETETECHNIK GMBH & CO. KG, Putzbrunn (DE)

(72) Inventor: Dennis Reininger, Munich (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 0 days.

(21) Appl. No.: 16/971,453

(22) PCT Filed: Jan. 23, 2019

(86) PCT No.: PCT/EP2019/000018
§ 371 (c)(1),
(2) Date: Aug. 20, 2020

(87) PCT Pub. No.: WO2019/161965
PCT Pub. Date: Aug. 29, 2019

(65) Prior Publication Data
US 2020/0393857 A1    Dec. 17, 2020

(30) Foreign Application Priority Data
Feb. 23, 2018 (DE) .......................... 102018001441.0

(51) Int. Cl.
*G05D 16/06* (2006.01)
*F16K 31/365* (2006.01)

(52) U.S. Cl.
CPC ....... *G05D 16/0655* (2013.01); *F16K 31/365* (2013.01); *G05D 16/0688* (2013.01); *Y10T 137/7825* (2015.04)

(58) Field of Classification Search
CPC .......... Y10T 137/7825; G05D 16/0655; G05D 16/0688; F16K 31/365
(Continued)

(56) References Cited

U.S. PATENT DOCUMENTS

| 156,785 | A | * | 11/1874 | Goward | ............. | G05D 16/0655 |
|---|---|---|---|---|---|---|
| | | | | | | 137/505.41 |
| 172,877 | A | * | 2/1876 | Hays | .................. | G05D 16/0655 |
| | | | | | | 137/505.41 |

(Continued)

FOREIGN PATENT DOCUMENTS

| DE | 2601055 A1 | 7/1977 |
|---|---|---|
| DE | 102007047440 A1 | 4/2009 |

(Continued)

*Primary Examiner* — William M McCalister
(74) *Attorney, Agent, or Firm* — McNees Wallace & Nurick LLC (57) ABSTRACT

The invention relates to a valve device (1) having a pressure regulator (3) for a flowing gas and a housing (4). The pressure regulator (3) includes a diaphragm (31), a spring (34), a control actuator (32), and a control seat (33). The control actuator (32) includes a plate-like portion (32') and a rod-like portion (32") adjacent to one side of the plate-like portion (32'), the control seat (31) encompassing the rod-like portion (32") of the control actuator (32). The diaphragm (31) and the control actuator (32) are mechanically coupled to each other such that an axial movement of the control actuator (32) moves the diaphragm (31). In addition, the spring (34) and the control actuator (32) are mechanically coupled to each other. The control seat (33) limits a movement of the control actuator (32). In one state, the control seat (33) and the control actuator (32) prevent the gas from flowing. The control seat (33) is configured as a ring arranged in a recess (40) of the housing (4).

3 Claims, 6 Drawing Sheets

(58) Field of Classification Search
USPC .................................................. 137/505.41
See application file for complete search history.

(56) References Cited

U.S. PATENT DOCUMENTS

| | | | | |
|---|---|---|---|---|
| 184,482 | A * | 11/1876 | Taylor ................ | G05D 16/0655 137/505.41 |
| 186,299 | A * | 1/1877 | Blossom ............ | F16K 17/0433 137/494 |
| 424,199 | A * | 3/1890 | Haskell .................. | F16K 17/00 137/462 |
| 473,069 | A * | 4/1892 | Geissenbier ....... | G05D 16/0655 137/505.41 |
| 1,556,310 | A * | 10/1925 | Crockett ............ | G05D 16/0655 137/505.41 |
| 1,637,764 | A * | 8/1927 | Coles ................ | G05D 16/0663 137/505.41 |
| 1,946,188 | A * | 2/1934 | Birch ................ | G05D 16/0402 137/505.41 |
| 2,016,234 | A * | 10/1935 | Hughes ............. | G05D 16/0402 137/505.12 |
| 2,359,111 | A * | 9/1944 | Hughes ............. | G05D 16/0655 137/69 |
| 2,380,459 | A * | 7/1945 | Niesemann ........ | G05D 16/0655 137/315.05 |
| 2,662,348 | A * | 12/1953 | Jacobsson .......... | G05D 16/0663 137/505.12 |
| 2,683,565 | A * | 7/1954 | Johnson ........................ | 236/1 H |
| 2,746,471 | A * | 5/1956 | Cobb ................ | G05D 16/0655 137/65 |
| 2,834,373 | A * | 5/1958 | Schwarz ............ | G05D 16/0641 137/484.2 |
| 2,842,146 | A | 7/1958 | Schuster | |
| 2,979,067 | A * | 4/1961 | Kern, Jr. ............ | G05D 16/0658 137/15.19 |
| 2,982,297 | A * | 5/1961 | Modes ............... | G05D 16/0655 137/271 |
| 2,987,309 | A * | 6/1961 | Biggle ............... | G05D 16/0663 267/173 |
| 2,995,145 | A * | 8/1961 | Heiser ................ | G05D 16/0663 137/454.2 |
| 3,035,608 | A * | 5/1962 | Ray ................... | G05D 16/0655 137/505.41 |
| 3,062,525 | A * | 11/1962 | Schutmaat ......... | G05D 16/0661 267/175 |
| 3,117,591 | A * | 1/1964 | Schutmaat ......... | G05D 16/0658 137/505.41 |
| 3,324,872 | A * | 6/1967 | Cloud ................ | G05D 23/1313 137/98 |
| 3,412,650 | A * | 11/1968 | Stang, Jr. ........... | G05D 16/0661 92/133 |
| 3,443,583 | A * | 5/1969 | Floyd ................ | G05D 16/0402 137/505.12 |
| 3,526,360 | A * | 9/1970 | Ray ....................... | F16K 31/385 236/68 R |
| 3,556,125 | A | 1/1971 | Dowdall | |
| 3,682,437 | A * | 8/1972 | Miller ................... | F16K 31/365 251/61.2 |
| 3,730,773 | A | 5/1973 | Graber | |
| 4,016,905 | A * | 4/1977 | Marlatt, Sr. ......... | G05D 16/0663 137/505.41 |
| 4,074,694 | A * | 2/1978 | Lee .................... | G05D 16/0658 137/505.38 |
| 4,793,379 | A * | 12/1988 | Eidsmore ................ | F16K 1/306 137/460 |
| 4,898,204 | A * | 2/1990 | Wallace ............. | G05D 16/0658 137/505.41 |
| 5,141,022 | A * | 8/1992 | Black ................ | G05D 16/0655 137/495 |
| 5,211,205 | A * | 5/1993 | Grant ..................... | F02M 69/54 123/457 |
| 5,520,533 | A | 5/1996 | Vrolijk | |
| 5,732,736 | A * | 3/1998 | Ollivier .............. | G05D 16/0658 137/505.41 |
| 6,026,850 | A * | 2/2000 | Newton ............. | G05D 16/0655 137/505 |
| 6,062,245 | A | 5/2000 | Berglind et al. | |
| 6,073,649 | A * | 6/2000 | Somorov ........... | G05D 16/0661 137/505 |
| 6,155,290 | A * | 12/2000 | Nakajima .......... | G05D 16/0402 137/505.41 |
| 6,273,117 | B1 * | 8/2001 | McPhee ............. | G05D 16/0647 137/12 |
| 2002/0083980 | A1 * | 7/2002 | Nakajima .......... | G05D 16/0663 137/505.41 |
| 2003/0196701 | A1 * | 10/2003 | Claire .................... | G05D 16/10 137/505.39 |
| 2008/0011365 | A1 * | 1/2008 | Newton .................. | F16K 41/12 137/540 |
| 2008/0047619 | A1 * | 2/2008 | Pechtold .............. | G05D 16/109 137/505.41 |
| 2012/0241658 | A1 * | 9/2012 | Clifford ................ | F16K 17/085 251/321 |
| 2019/0072988 | A1 * | 3/2019 | Sugiyama ......... | H01M 8/04104 |

FOREIGN PATENT DOCUMENTS

| | | |
|---|---|---|
| DE | 102008040413 A1 | 11/2009 |
| DE | 102012111106 B3 | 1/2014 |
| EP | 0080180 A2 | 6/1983 |
| EP | 0644377 B1 | 10/1996 |
| WO | 2016180966 A1 | 11/2016 |

* cited by examiner

VALVE DEVICE

The present invention relates to a valve device. An alternative designation is gas valve.

Various implementations of valve devices are known in the prior art in which, for example, valves and pressure regulators are combined and in some cases arranged in a shared housing (see, e.g., U.S. Pat. No. 2,842,146 A, DE 26 01 055 A1, EP 0 080 180 A2 or EP 0 644 377 B1). Further configurations of valves can be found, for example, in DE 10 2008 040 413 A1, DE 10 2007 047 440 A1 or DE 10 2012 111 106 B3.

The pressure regulators have in particular the function of reducing gas pressures or limiting the gas pressure to a maximum value. In the prior art, a pressure regulator usually has a space through which the gas flows and which is delimited by a diaphragm. Acting on the diaphragm is, on the one hand, a spring which is also used for setting the maximum pressure value. On the other hand, a control actuator is provided which reacts to the gas pressure and acts on the diaphragm. The control actuator is configured, if necessary additionally, in such a way that it can interrupt a flow of the gas.

In the prior art, valve devices of this type are usually very large and expensive to manufacture.

The object of the invention is to provide a valve device which distinguishes itself by as compact a structure as possible and by a simplified manufacture.

The invention achieves the object by providing a valve device including a pressure regulator for a flowing gas and a housing, the pressure regulator including a diaphragm, a spring, a control actuator, and a control seat, the control actuator including a plate-like portion and a rod-like portion adjacent to one side of the plate-like portion, the control seat encompassing the rod-like portion of the control actuator, the diaphragm and the control actuator being mechanically coupled to each other such that an axial movement of the control actuator moves the diaphragm, the spring and the control actuator being mechanically coupled to each other in such a way that the spring urges the control actuator toward a face side of the control seat, the control seat limiting a movement of the control actuator, the control seat and the control actuator, in one state, preventing the gas from flowing, and the control seat being configured as a ring arranged in a recess of the housing. In one configuration, the control seat is press-fitted in the housing.

The pressure regulator of the valve device according to the invention includes a diaphragm, a spring, and a control actuator and a control seat.

Here, a spring is understood to mean any device that generally acts as a spring. In one configuration, the spring involves one single spring element. The diaphragm and the control actuator are preferably mechanically coupled to each other. Furthermore, the spring and the control actuator are mechanically coupled to each other so that the spring presses the control actuator against the control seat and in particular against a (preferably upper) face side of the control seat. This also means that upon a movement of the control actuator, it is moved against the spring. Therefore, in one configuration, in the event that the control actuator is to be moved, a force has to be applied that is greater than the spring force acting on the control actuator.

Preferably, the spring and the gas pressure act on the control actuator as a whole, the spring being directed opposite to the direction of the flowing gas.

The control seat limits a movement of the control actuator. This is effected, for example, in that the control actuator has a defined movement path relative to the control seat. When the control actuator (or, in one configuration, more precisely: a plate-like portion of the control actuator) moves towards the control seat, the control actuator, in one configuration, eventually rests on a face side of the control seat, so that no further movement in this direction is possible.

Finally, the control seat and the control actuator cooperate in such a way that in one state—in one configuration, depending on a position of the control actuator relative to the control seat—the flow of the gas through the pressure regulator is prevented. That is, in one state no gas can flow through the pressure regulator; the latter is blocked. In one configuration, this state is associated with a maximum pressure value for the gas pressure.

The control seat has the shape of a ring, which is located in a recess of the housing of the valve device. The pressure regulator is thus part of the housing of the valve device. Therefore, this results in a compact structure, since the housing is also used for the pressure regulator. In one configuration, the control seat is more particularly pressed-fitted in the recess with an interlocking fit.

The control actuator includes a plate-like (preferably rotationally symmetrical and/or circular) portion and a rod-like portion adjacent to one side of the plate-like portion, the control seat encompassing the rod-like portion of the control actuator. The control actuator has at least two portions: a plate-like and therefore flat portion and a rod-like and therefore oblong portion. The rod-like portion is adjacent to the plate-like portion here. In one configuration, one end of the rod-like portion extends from one side of the plate-like portion—and preferably from the center thereof. The rod-like portion is encompassed by the control seat and is thus also located in the inner recess of the ring-shaped control seat. In one configuration, this causes the control actuator to move axially in relation to the control seat.

One configuration resides in that the diaphragm and the control actuator are mechanically coupled to each other in that the diaphragm spans across the control actuator, or in that the diaphragm encompasses the plate-like portion of the control actuator, or in that the diaphragm and the plate-like portion of the control actuator are configured in one piece.

In one configuration, the control seat is a ring made of a metal.

In one configuration, it is provided that the housing and the diaphragm encompass a flow-through chamber, that the pressure regulator includes a regulator cover which is connected to the housing, and that the regulator cover and the diaphragm encompass a compensating chamber.

In this configuration, a regulator cover is connected with the housing. The regulator cover, the diaphragm and the housing (and here in particular the recess of the housing) define a total of—at least—two chambers: a flow-through chamber and a compensating chamber. The gas preferably flows through the flow-through chamber. The diaphragm separates the two chambers from each other. In one configuration, more particularly, no gas reaches the compensating chamber from the flow-through chamber.

According to one configuration, the valve device further includes at least one valve. In one configuration, the valve is a solenoid valve. Furthermore, the valve is preferably formed in or at least partly by the housing. In one configuration, the pressure regulator and the at least one valve are connected to each other in respect of the gas by channels in the housing.

The following configuration relates to the free end of the rod-like portion, which is thus opposite the end that contacts the plate-like portion.

Provision is made here that the free end of the rod-like portion of the control actuator is connected with a sealing element and that, in one position of the control actuator, the sealing element closes a face side of the control seat.

The free end thus carries a sealing element. In a particular relative position between the control actuator and the control seat, the sealing element closes one face side of the control seat and therefore also the interior of the control seat in relation to this face side. This preferably prevents the flow of gas. In this position or in this state, the pressure regulator thus closes the passageway for the gas.

In an alternative or supplementary configuration, a control gap is provided between one face side of the control seat and the sealing element, on which the amount of gas depends that reaches the interior of the control seat and thus, in one configuration, also the flow-through chamber.

In one configuration, the position of the control actuator relates to a specific axial position of the control actuator.

In a supplementary configuration, this is accompanied by the fact that there is an axial position of the control actuator in which a further axial movement of the control actuator is no longer possible and that there is a different axial position in which the gas stream is interrupted. The first axial position is preferably associated with the plate-like portion resting on one face side (e.g. the upper one) of the control seat, and the second axial position is associated with the sealing element closing the other face side (thus the lower one) of the control seat. The control actuator moves between these two positions.

In one configuration, the movement of the control actuator between the two positions has an effect on the amount of gas that flows into the interior of the control seat. In one configuration, a width of a gap between a sealing element of the control actuator and a face side—in particular the lower one—of the control seat is varied here.

In one configuration, the sealing element is in the shape of a hemisphere. In a supplementary configuration, it is provided that the sealing element includes a chamfer in a transition from a spherical portion to a planar portion of the hemisphere. In one configuration, the chamfer serves in particular for the gas-tight closure of the inside diameter of the control seat.

In one configuration, the control seat has a tapering inner contour. In one configuration, the face side having the largest inside diameter faces the diaphragm. The inside diameter tapering in the axial direction is of advantage for the assembly of the valve device, since this allows, for example, the sealing element of the control actuator to be inserted more easily. A further advantage, in particular in the configuration in which the inside diameter decreases starting from the diaphragm, is given in that the sealing element needs to close a smaller diameter.

In a further configuration, the control seat has a conically tapering inner contour.

According to one configuration, the control seat is rounded on an inside of one face side. In one configuration, this face side is closed by the sealing element of the control actuator. The rounded portion here serves to improve the closure by improving the contact between the control seat and the sealing element. In addition, in one configuration the sealing element has the aforesaid chamfer.

One configuration provides that the control seat has at least one interruption in one face side. This interruption provides for two flanking merlons or prongs. In one configuration, the interruption (or a plurality of interruptions, where required) serves to allow gas to flow through the interior of the control seat and then to leave the interior.

Therefore, in one configuration, in particular a gas communication takes place between the interior of the control seat and the flow-through chamber, and this even occurs in the event that the control actuator rests on the face side of the control seat. In one configuration, at least two interruptions are provided.

One configuration consists in that the valve device includes an adjusting device for adjusting a spring force by means of which the spring acts on the control actuator. Using this spring force, the spring presses the control actuator against the control seat. In one configuration, the gas acts against the spring. Therefore, the control actuator will only move in the event that a gas pressure exists which exerts a force on the control actuator that is above the spring force.

According to one configuration, the regulator cover has a compensating hole that is in communication with a compensating chamber which is encompassed by the regulator cover and the diaphragm. When the volume of the compensating chamber changes as a result of a movement of the diaphragm, air will move through the compensating hole and into or out of the compensating chamber. In one configuration, the compensating hole is in communication with the ambient air.

In detail, there are a multitude of possibilities to configure and further develop the valve device according to the invention. In this respect, reference is made, on the one hand, to the claims subordinate to claim 1 and, on the other hand, to the following description of exemplary embodiments in conjunction with the drawings, in which:

Figure 1:
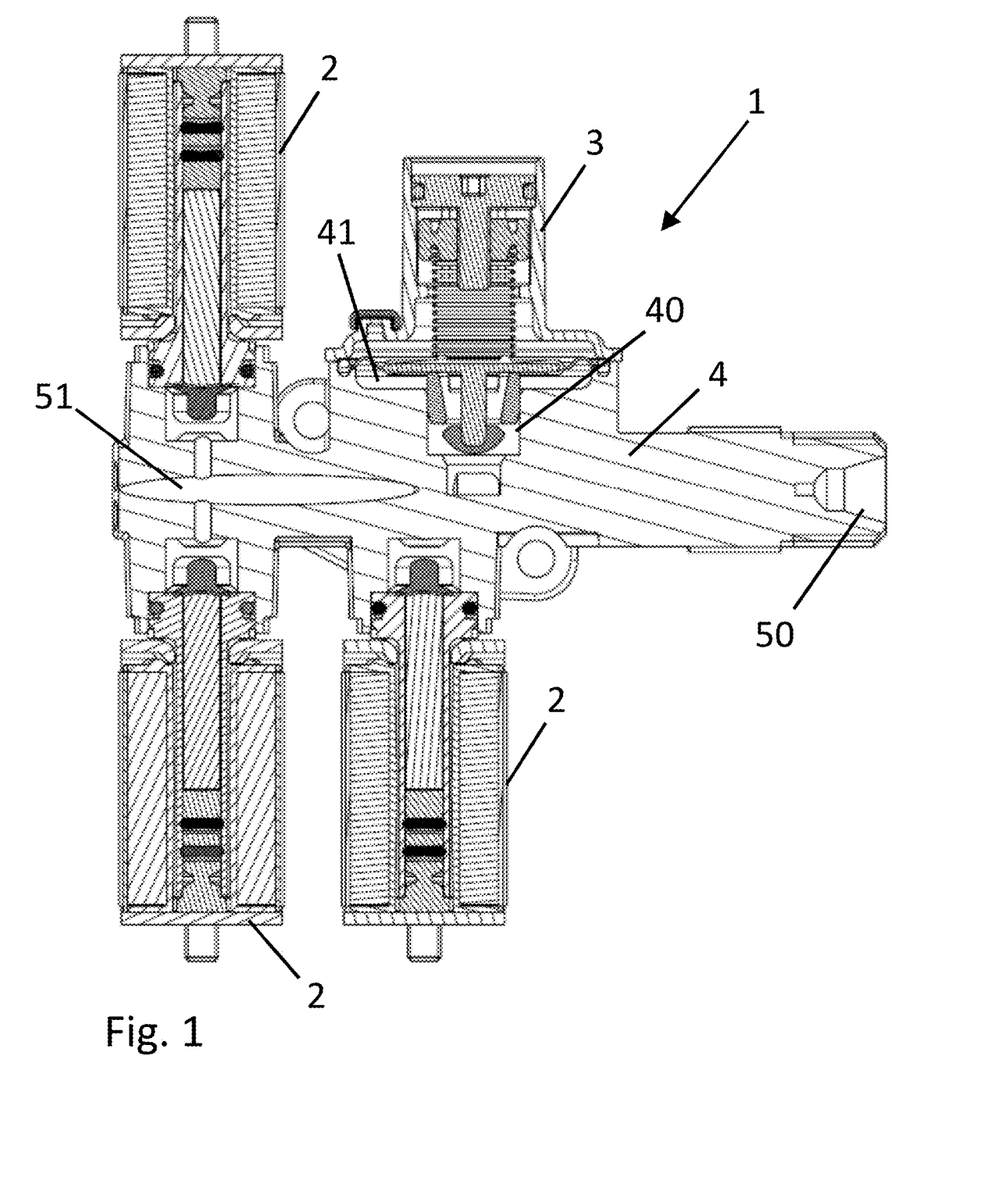
FIG. 1 shows a section taken through a first configuration of a valve device.

FIG. 1 shows a configuration of a valve device 1, which has three solenoid valves 2 and a pressure regulator 3. The valve device 1 is used here, for example, to supply combustible gas to a burner (not shown here) as part of a heating system. Alternatively, the valve device 1 is referred to as a gas valve.

It can be seen that the three solenoid valves 2 and the pressure regulator 3 together are located in a solid housing 4. In the section shown, one solenoid valve 2 and the pressure regulator 3 are on one side and the other two solenoid valves 2 are on the opposite side. Two solenoid valves 2 are located mirror-symmetrically opposite each other in the illustration.

Arranged in the housing 4 are recesses and passageways which allow flow of the gas and the action of the valves 2 and the pressure regulator 3.

The gas inlet 50 is located on the right side here. From there the gas flows in a duct (not shown here) to the recess 40 below the pressure regulator 3 and then through the pressure regulator 3 and into a passage 41. From there a further duct (also not shown here) leads to the solenoid valve 2 below the pressure regulator 3. An adjoining duct (not shown here) permits access to a distributor chamber 51, to which the other two solenoid valves 2 are coupled. Starting from these solenoid valves 2, a gas outlet (not shown and located behind the sectional plane here) is supplied, which would have to be connected to a burner (not shown).

Figure 2:
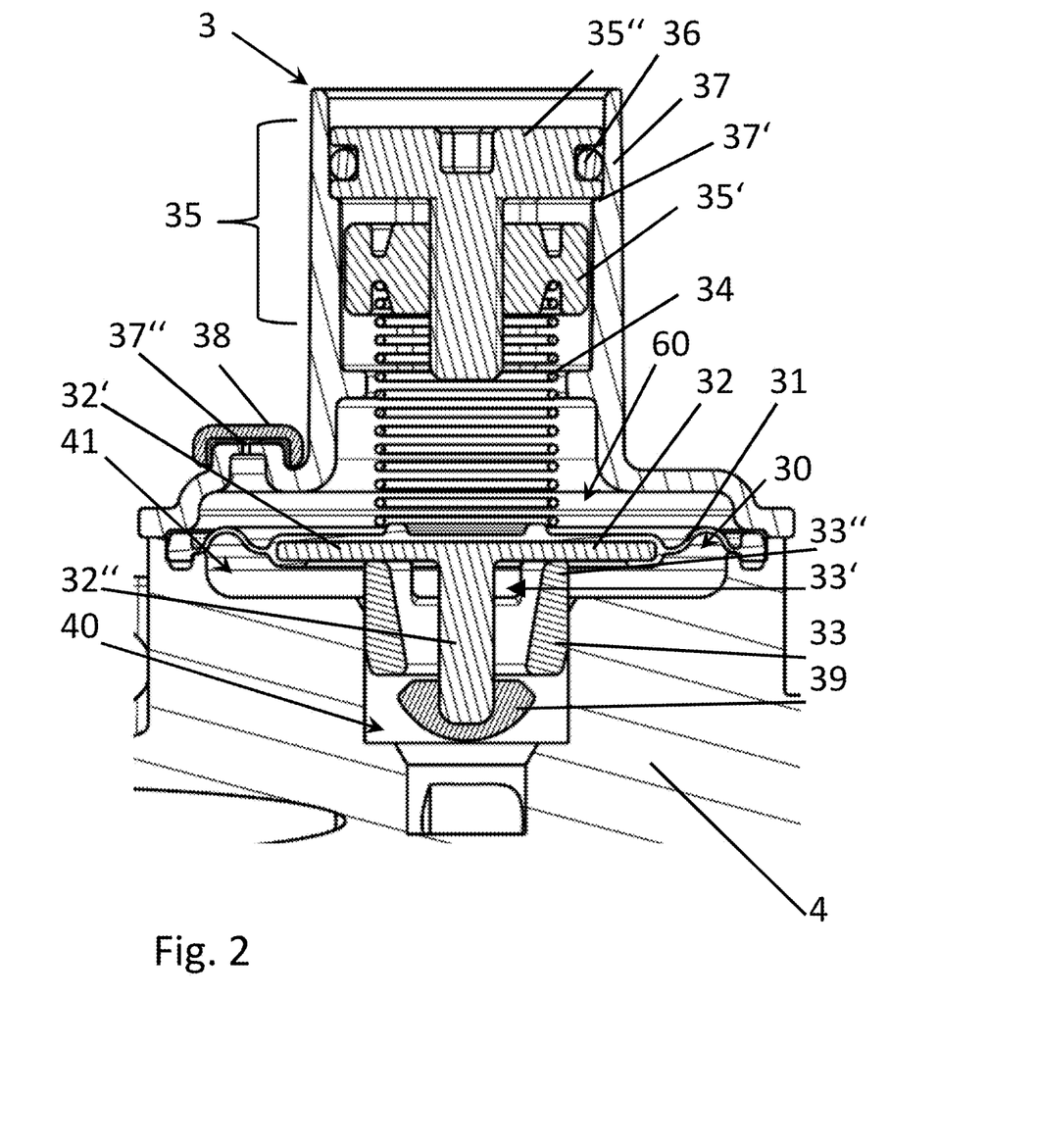
FIG. 2 shows an enlarged detail of FIG. 1.
Figure 3:
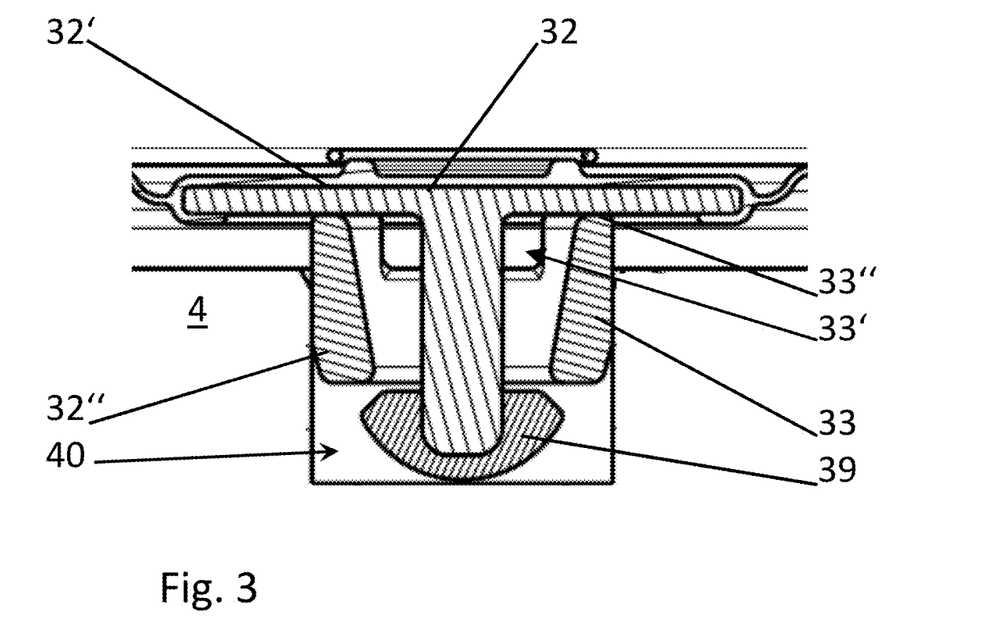
FIG. 3 shows a further enlarged detail of FIG. 1.

The pressure regulator 3 is shown on an enlarged scale in FIG. 2 and FIG. 3. The purpose of the pressure regulator 3 is to prevent an excessive gas pressure (or in particular a pressure above a specifiable maximum pressure value).

The gas enters the recess 40 of the housing 4 and, depending on the position of the control actuator 32, moves through the interior of the control seat 33 and into the passage 41. This flow-through chamber 30 formed in this way is closed by a diaphragm 31 on the side facing away from the recess 40. The control actuator 32 is mechanically connected to the diaphragm 31 in such a way that an axial movement of the control actuator 32 moves the diaphragm 31.

The control actuator 32 has a die-like configuration and exhibits a plate-like portion 32'. A rod-like portion 32" is located on the side of the plate-like portion 32' that faces away from the diaphragm 31. The rod-like portion 32" is radially encompassed by the control seat 33. In the configuration shown, the control seat 33 is a metal ring the inner surface of which tapers conically in one direction —here toward the side facing away from the diaphragm 31. In one configuration, the metal ring is more particularly made of brass and, in one configuration, it is a turned part.

A sealing element 39 is located at the free face side—i.e. the side facing away from the diaphragm 31—of the rod-like portion 32" of the control actuator 32. The sealing element 39 more particularly has a radial extent (for example in relation to the longitudinal axis defined by the rod-like portion 32") such that a gap (that is, a control gap) is obtained between the sealing element 39 and the lower face side of the control seat 33. The size of the control gap dictates how much gas can flow into the interior of the control seat 33.

The plate-like portion 32' of the control actuator 32 is pressed —indirectly by means of the diaphragm 31—against the upper side of the control seat 33 by a spring 34. The spring 34 rests on a portion of the diaphragm 31 located above the plate-like portion 32'.

In the configuration shown, the diaphragm 31 spans the flow-through chamber 30 through which the gas flows, and thus also the control actuator 32. In an alternative design (not illustrated), the diaphragm 31 encompasses the plate-like portion 32', and in a further design (also not illustrated), the diaphragm 31 and the plate-like portion 32' are configured in one piece.

As already described, one side of the spring 34 is connected to the diaphragm 31 and the control actuator 32. The other side of the spring 34 is connected with an adjusting device 35 for mechanically adjusting the maximum permissible pressure value.

In the illustrated configuration, the adjusting device 35 consists of a spring holder 35' that is ring-shaped (or in the form of a nut) and an adjusting screw 35". The—nut-type—spring holder 35' here has an internal thread and the adjusting screw 35" has a matching external thread. The spring holder 35' and the adjusting screw 35" are in engagement with each other.

On the upper face side of the adjusting screw 35" a depression is visible, which allows, for example, to insert a suitable tool—e.g. an Allen key—so that the spring holder 35' is moved axially by turning the adjusting screw 35", which here rests on a shoulder 37' of the regulator cover 37. This axial movement towards the control actuator 32 or away from the control actuator 32 causes the spring 34 to be tensioned or relaxed accordingly. This increases or decreases the maximum pressure value.

The adjusting device 35 is located in a chimney-like portion of the regulator cover 37, which is connected to the housing 4 and encloses the compensating chamber 60 above the diaphragm 31. A constriction in the chimney portion restricts the axial travel of the spring holder 35' towards the diaphragm 31. Also visible is the radially encircling recess in the face side of the spring holder 35', in which one side of the spring 34 rests.

The diaphragm 31 and the regulator cover 37 define a compensating chamber 60 which compensates changes in the flow-through chamber 30.

In one configuration, the axial portion of the regulator cover 37 above the adjusting screw 35" is crimped inwards—e.g. during a production of valve device 1—and the adjusting screw 35" is fixed in place in this way.

The head of the adjusting screw 35" has a circumferential groove in which an O-ring is inserted as a sealing device 36. This seals the area between the adjusting screw 35" and the regulator cover 37.

To allow a change in the volume of the compensating chamber 60 above the diaphragm 31—occurring as a result of an axial movement of the control actuator 32 and thus of the diaphragm 31—a compensating hole 37" is provided laterally in the regulator cover 37, which is in communication with the environment of the valve device 1. In this way, air can enter, or escape from, the pressure regulator 3. The cap 38 protects the compensating hole 37" and thus the compensating chamber 60 in the regulator cover 37 above the diaphragm 31 from dirt and moisture.

The operation of the pressure regulator 3 will now be described. This primarily involves the movement of the control actuator 32 as a result of the gas pressure acting on it.

When the pressure in the flow-through chamber 30 is low enough, the spring 34 presses the control actuator 32 against the control seat 33.

When the pressure of the entering gas increases, a force contrary to the spring 34 acts on the control actuator 32, here in particular in the axial direction. The force acting causes the control actuator 32 to move in the axial direction (here upwards) in the control seat 33 when the force due to the gas is greater than the spring force. This movement reduces the control gap so that less gas passes through the interior of the control seat 33 and into the flow-through chamber 30. This reduces the pressure.

When the control actuator 32 moves sufficiently far axially, the sealing element 39 closes the lower face side of the control seat 33 so that gas can no longer enter the passage 41. Closing is simplified in that the radially tapering inside diameter of the ring-shaped control seat 33 has its smallest inside diameter at this lower face side.

In the configuration shown, closing is enhanced in that the sealing element 39 has a chamfer in the areas that come into contact with the lower face side of the control seat 33 (cf. the enlarged detail of FIG. 3). This chamfer comes into contact with the rounded inner surface of the lower face side of the control seat 33. This combination causes the gas flow to reliably approach zero when the transition between the control seat 33 is closed.

In the configuration shown, the sealing element 39 is made of a rubber and has the shape of a hemisphere. The chamfer mentioned is located at the transition from the spherical to the planar area of the sealing element 39.

In an alternative configuration (not shown), the sealing element 39 abuts over its surface against the lower face side of the control seat 33, closing it in this way.

Once the control actuator 32 has thus reached a sufficiently large axial deflection, the interior of the control seat 33 is closed and gas no longer passes through the pressure regulator 3. This is correspondingly associated with the maximum permissible gas pressure. In this way it is ensured that the gas pressure can only rise up to the pressure value specified by means of the adjusting device 35. The maximum pressure value is furthermore dependent on the geometry of the components that close the passage of the gas: control actuator 32 (specifically the length of the rod-like portion 32" and the position and configuration of the sealing element 39) and control seat 33 (in particular the axial height thereof).

Furthermore, the pressure below this specified pressure value is reduced by the movement of the control actuator 32 and the reduction of the control gap. The pressure above which the control actuator 32 will move is likewise dependent on the specification by the adjusting device 35.

The arrangement of the control seat 33 in which the largest inside diameter faces the diaphragm 31 is also made use of for the manufacture of the pressure regulator 3.

The control seat 33 is received in the recess 40 by means of an interference fit. In the process, the control seat 33 is received at its interruptions 33' and pressed in flush therewith. The control actuator 32 with its sealing element 39 can then be pressed through the control seat 33. The bevel which is in particular conical here and is applied to the inside of the control seat 33, which has the shape of a ring, allows an easy assembly here, since in this way the sealing element 39 can be slowly and increasingly compressed. Subsequently, assembly of the remaining components of the pressure regulator 3 is performed.

Thus, during manufacture, at least the following steps are provided with respect to the production of the pressure regulator 3:

In a first step, the ring-shaped control seat 33 is placed in the recess 40 of the housing 4. In the following step, the control actuator 32 with the sealing element 39 is inserted through the inner recess of the control seat 33. This is followed by all other steps, e.g. fixing the diaphragm 31 in place and fastening the regulator cover 37.

All in all, it can be seen that the pressure regulator 3 comprises an interior which is divided into two—the flow-through chamber 30 and the compensating chamber 60—by a diaphragm 31 and which is formed by a recess 40 in the housing 4 and by a regulator cover 37. In the configuration shown, the regulator cover 37 serves to receive the spring 34 against which the gas pressure acts. The control seat 33, which is shaped as a ring and which has been inserted into the recess 40, which here is circular cylindrical, of the housing 4, is used for guiding the control actuator 32 and for limiting its two maximum states (this is, on the one hand, its resting on the upper face side 33" and, on the other hand, its closing of the opening of the lower face side of the control seat 33).

Figure 4:
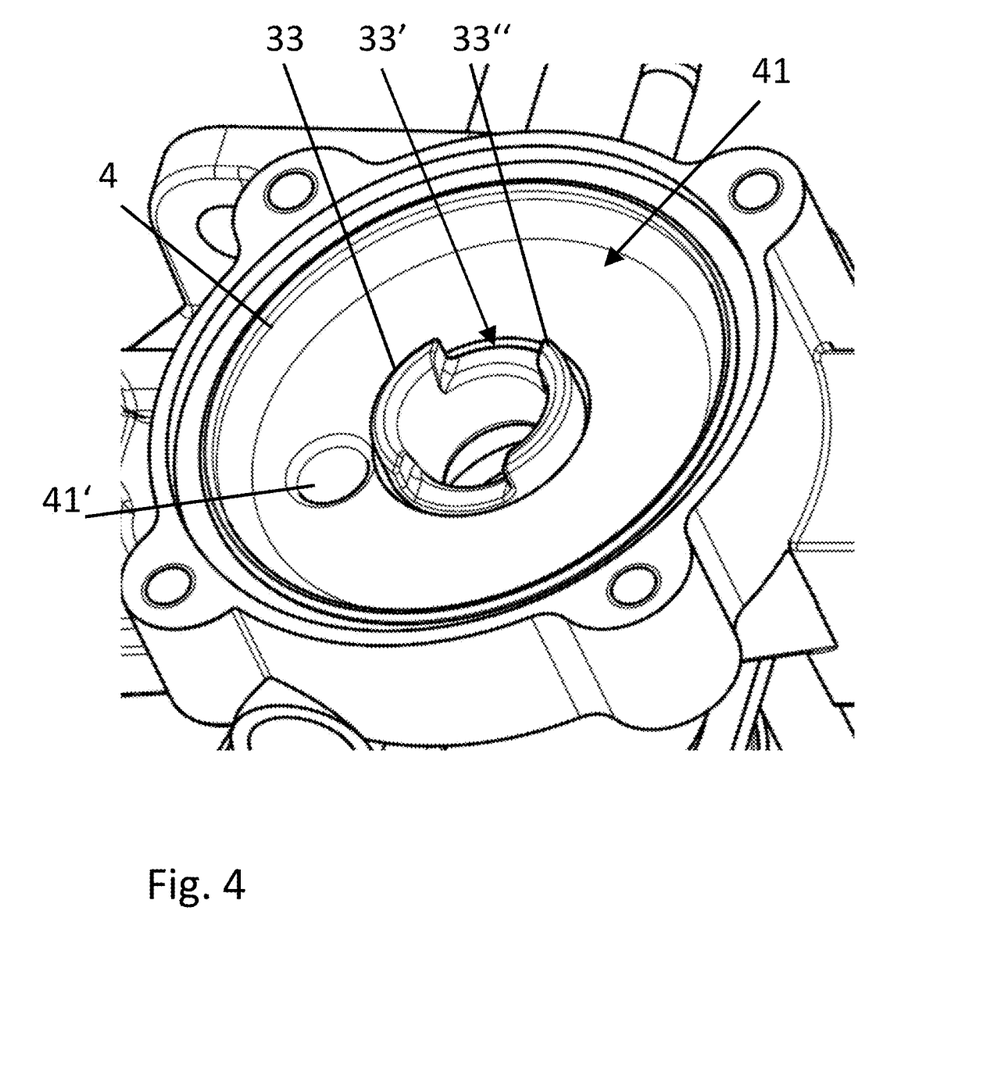
FIG. 4 shows a spatial top view of part of the valve device of FIG. 1.

FIG. 4 shows the control seat 33 in a spatial illustration.

In the variant shown, the control seat 33 has two interruptions 33' at the upper face side 33" facing the diaphragm, between which two merlons are located. Other types of upper face side 33", shapes of the interruptions 33' or of the merlons or different numbers of interruptions 33' can also be realized here. The upper face side 33" may also be referred to as the face side having the largest inside diameter of the ring-shaped control seat 33.

A comparison of FIG. 4 and FIG. 2 shows that the gas moves through the interior of the control seat 33 and the interruptions 33' into the passage 41.

Also apparent from FIG. 4 are the position of the control seat 33 in the recess —which is concealed here—of the housing 4 and the passage 41 radially surrounding the control seat 33. In addition, the outlet 41' is shown, through which the gas leaves the passage 41 and thus the pressure regulator 3.

Figure 5:
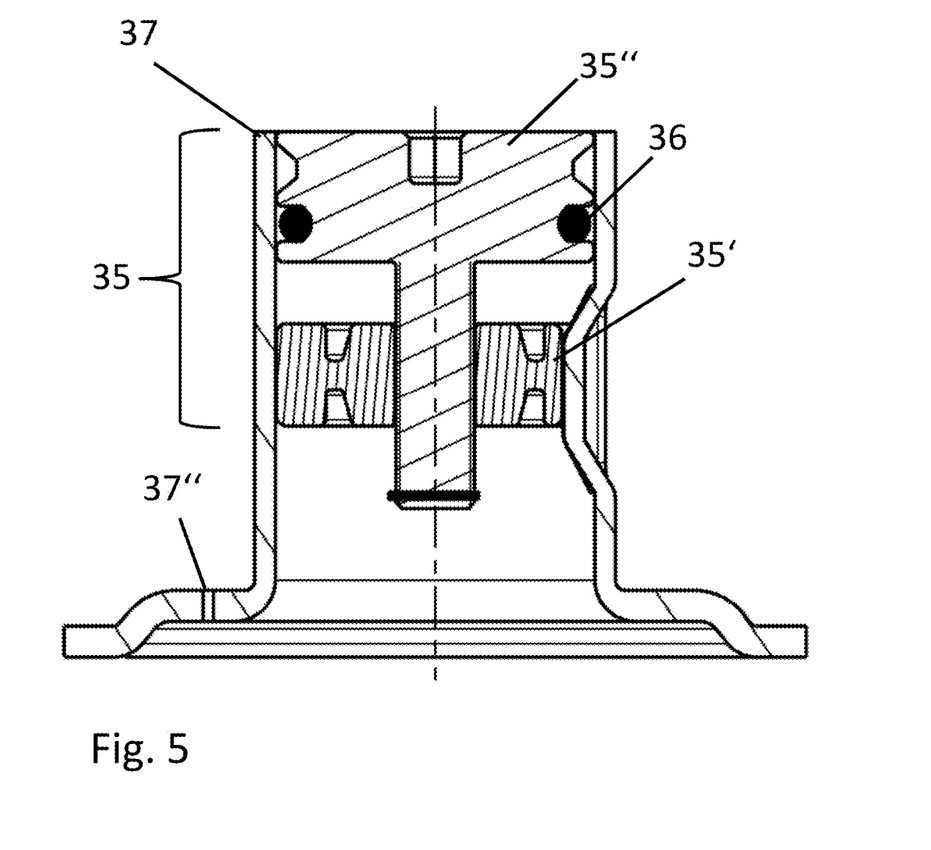
FIG. 5 shows a section taken through part of a second configuration of a valve device.

FIG. 5 shows a section taken through an alternative configuration of the regulator cover 37. It involves, for example, a deep-drawn aluminum part as opposed to, e.g., a die-cast aluminum configuration.

The base body of the adjusting screw 35" here has two circumferential grooves. Located in the lower groove is the O-ring as an example of the sealing device 36. During manufacture, the wall of the axial portion of the regulator cover 37 is pressed into the other groove for fixing in place.

In the variant shown, a locking of the nut-shaped spring holder 35' is obtained by means of the unilateral and locally limited indentation on the side (this is the right-hand side here) of the regulator cover 37. The compensating hole 37" is located next to the chimney-like portion of the regulator cover 37 for receiving the adjusting device 35.

Figure 6:
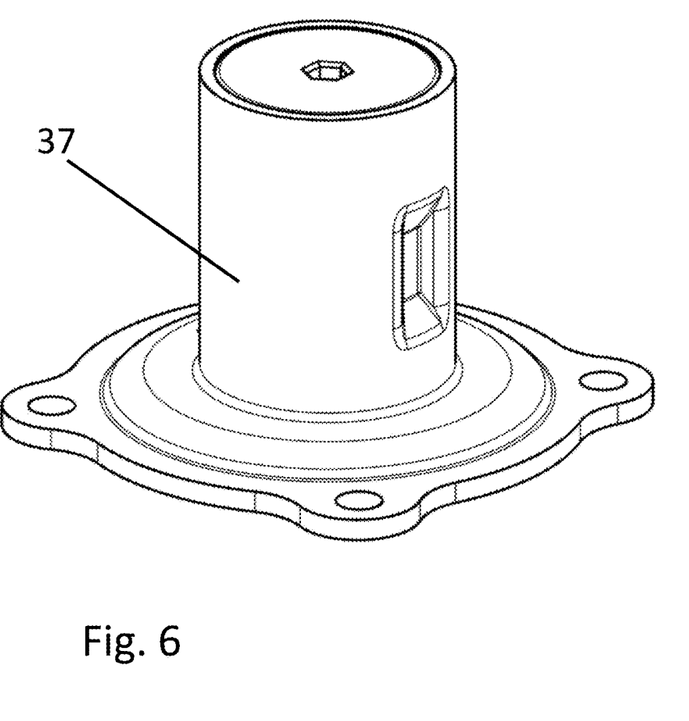
FIG. 6 shows a spatial top view of the part of the valve device of FIG. 5.

Visible in the spatial representation of FIG. 6 are the locally limited indentation and the recesses—four are provided in the configuration shown—for fixing the regulator cover 37 in place on the housing 4.

LIST OF REFERENCE NUMBERS 1 valve device
2 solenoid valve
3 pressure regulator
4 housing
30 flow-through chamber
31 diaphragm
32 control actuator
32' plate-like portion of the control actuator
32" rod-like portion of the control actuator
33 control seat
33' interruption of the control seat
33" face side of the control seat
34 spring
35 adjusting device
35' spring holder of the adjusting device
35" adjusting screw of the adjusting device
36 sealing device
37 regulator cover
37' shoulder in the chimney-like portion of the regulator cover
37" compensating hole in the regulator cover
38 cap
39 sealing element on the control actuator
40 recess in the housing
41 passage in the housing
41' outlet of the passage
50 gas inlet of the valve device
51 distributor chamber in the housing
60 compensating chamber

The invention claimed is:

1. A valve device, comprising:
    a pressure regulator for a flowing gas and including a housing,
        the pressure regulator including a diaphragm, a spring, a control actuator, and a control seat,
        the housing and the diaphragm encompassing a flow-through chamber,
        the pressure regulator including a regulator cover which is connected to the housing, the regulator cover and the diaphragm encompassing a compensating chamber, the control actuator including a plate-like portion and a rod-like portion adjacent to one side of the plate-like portion, the control seat encompassing the rod-like portion of the control actuator, the diaphragm and the control actuator being mechanically coupled to each other such that an axial movement of the control actuator moves the diaphragm, the spring and the control actuator being mechanically coupled to each other in such a way that the spring urges the control actuator toward a face side of the control seat, the control seat limiting a movement of the control actuator, the control seat and the control actuator, in one state, preventing the gas from flowing, the control seat being configured as a ring arranged in a recess of the housing, and the control seat having at least one interruption in one face side so that two merlons are formed laterally of the interruption and so that a gas communication takes place between an interior of the control seat and the flow-through chamber even in the event that the control actuator rests on the face side, wherein:

a free end of the rod-like portion of the control actuator is connected to a sealing element, in one position of the control actuator, the sealing element closes a lower face side of the control seat, a control gap is formed between the sealing element and the lower face side of the control seat, which is dependent on an axial position of the control actuator, the sealing element is shaped as a hemisphere, the sealing element includes a chamfer at a transition from a spherical portion to a planar portion of the hemisphere, wherein the planar portion of the hemisphere faces towards the lower face side of the control seat and the chamfer comes into contact with the lower face side of the control seat, and the control seat has a tapering inner contour.

2. The valve device according to claim 1, wherein the control seat has a conically tapering inner contour.

3. The valve device according to claim 1, wherein the regulator cover has a compensating hole which is in communication with a compensating chamber that is encompassed by the regulator cover and the diaphragm.

* * * * *